United States Patent [19]
Dietrich

[11] 3,861,047
[45] Jan. 21, 1975

[54] TAPER GAUGE
[76] Inventor: Otto E. Dietrich, 617 W. Jackson St., Morton, Ill.
[22] Filed: Aug. 9, 1972
[21] Appl. No.: 278,946

[52] U.S. Cl. .............................. 33/174 E, 33/147 R
[51] Int. Cl. .............................................. G01b 5/00
[58] Field of Search ....................... 33/174 E, 147 R

[56] References Cited
UNITED STATES PATENTS

| | | | |
|---|---|---|---|
| 785,739 | 3/1905 | Kettnich | 33/174 E |
| 1,643,570 | 9/1927 | Bartholdy | 33/174 E |
| 2,500,558 | 3/1950 | Maxwell | 33/174 E |

*Primary Examiner*—William D. Martin, Jr.

[57] ABSTRACT

In a preferred embodiment, a gauge for measuring the presence and absence of deviations from standard in taper of a shaft or workpiece, including a handled gauge device having semi-circular yokes at each of opposite ends of a connecting structure extending therebetween, in which each yoke section on its annular face includes at least three pins of predetermined length for defining at their ends an imaginary circle or arc into which a shaft or workpiece being measured would be placed, the improvement being the pin(s) adjacent one end of the yoke section is movable axially to and fro by pressure on its end and this movable pin(s) being mounted functionally to move a dial indicator as it moves inwardly and outwardly such that depending upon its degree of being to or fro the dial indicator indicates the presence or absence of a proper tapering, and by being movable to and fro at an edge location a shaft of any of varying sizes may be measured for tapering degree.

1 Claim, 3 Drawing Figures

PATENTED JAN 21 1975　　　　　3,861,047

OTTO E. DIETRICH
INVENTOR.

BY

TAPER GAUGE

This invention relates to measuring and gauging devices and more specfically to a gauge to determine the amount of taper in a shaft or workpiece.

The object of the invention is to provide a simple, inexpensive device to check the correctness of a taper, for example, a shank of a drill or other tool by inexperienced personnel in a matter of seconds. One popular method now being used is by making an elaborate time consuming setup with sine-bar.

The device is more fully described by referring to the drawings in which.

Figure 1:
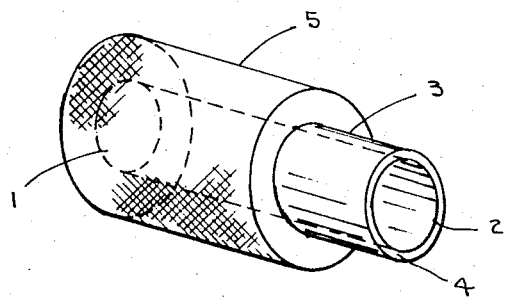
FIG. 1 is a pictorial view of the simplest form of the device.

Referring to FIG. 1 in the drawings, this gauge is a single, one-piece cylinder and has an established closely controlled inside diameter at 1. This may be the same diameter throughout or made slightly smaller at the opposite end 2 to provide a closer fit to the taper. However this is made when the gauge is being used; the inside diameter does not touch the taper except at the end 1. The smaller outside diameter shown at 3 is made to provide a thin wall at the diameter 2 and may be made straight or cone-shaped. The end face at 4 is made narrow so the measuring pads of a micrometer can be placed against it to measure the diameter of the taper at this face. The surface diameter at 5 is knurled to prevent the gauge from slipping when in use.

Figure 2:
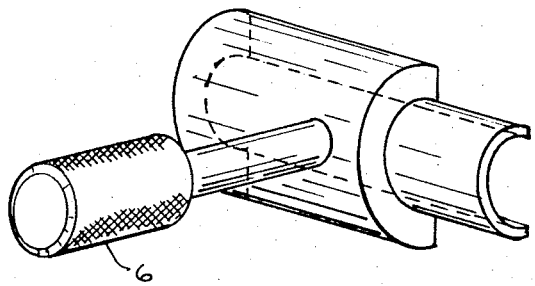
FIG. 2 is a pictorial view of a second embodiment of the device.

FIG. 2 shows a similar device, but the cylinder is open the full length as shown so the gauge can be placed over the tapered workpiece without removing the workpiece from the machine that is making it. A handle shown at 6 is used to easily place or remove the gauge from the workpiece.

Figure 3:
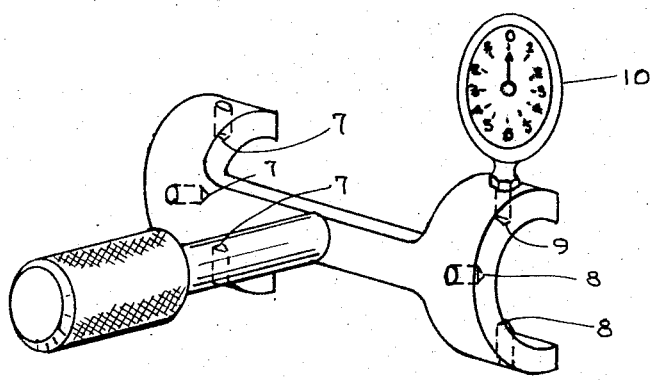
FIG. 3 is a pictorial view of a third embodiment of the device.

In FIG. 3 is shown a somewhat similar device with an open side as the design in FIG. 2. A number of fixed pin ends 7 form the large inside diameter, and 2 fixed pin ends 8 and a floating pin end 9 form the small inside diameter. The floating pin end is connected to a dial indicator 10 which is set for zero when the diameter is perfect. When the diameter of the taper is not perfect, the indicator will show if the diameter is too large or too small. This design could also be made as in FIG. 1 with the pin ends forming a complete circle.

Assuming that the gauge is made as in FIG. 1 and is to be used to check a 2 Morse or American Standard taper, the diameter at the end 1 could be made 0.699 inches and the length 2.00 inches. Since the taper per inch of a 2 Morse or American Standard is 0.04995, then the diameter at the end 2 should be 0.699 minus 0.0495 times 2 or 0.600 inches for a perfect taper. For standard industrial practice this 0.600 diameter seems to be a maximum and may be 0.002 smaller and still be within an accepted limit. This would mean that the tolerance on this diameter can be 0.001 per inch smaller than perfect. To check the taper of a 2 Morse or American Standard taper, the operator would slip the gauge over the tapered drill shank until the 0.699 diameter of the gauge stops on the same diameter of the taper. By placing a micrometer against the faced ends of the gauge, and if the diameter is larger than 0.600, the taper would be too flat and if smaller than 0.598 the taper would be too steep.

The device shown in FIG. 2 would be slipped over the taper while it is in the machine until the larger diameter fully contacts the same diameter on the taper. The small end would again be measured to determine the correctness of the taper.

To use the device shown in FIG. 3, the operator would slip it over the taper being machined and slide it up until the 0.699 diameter formed by the pin ends would contact the same diameter on the paper. At the small end of the gauge the pins would have previously been adjusted to form a 0.600 diameter and the dial indicator set to read zero. If the taper would be larger or smaller, the indicator would show this variation.

This same design could be made so the pins at either end form a complete circle as in FIG. 1. Then the checking operation would be the same as the FIG. 1 design except that the taper variation would be read directly without using the micrometer or caliper.

What I claim is:

1. A shaft-taper measuring-gauge device comprising in combination, a pair of spaced-apart semi-circular yoke-shaped structure each having a concave face wherein the concave face on one of said yoke-shaped structures is in substantical alignment with the other concave face of the other of said yoke-shaped structures a member for fixedly connecting said yoke-shaped structures, a handle structure extending laterally outwardly from said member, said yoke-shaped structures each further including three radially inwarding extending pins extending from said concave faces, wherein at least two of said pins in each of said yoke structures are in linear alignment, in one of said yoke-structures one of the pins which is in linear alignment being mounted for axial movement, and including indicator means responsive to the movement of said movable pin to indicate axial movements to and fro of said movable pin.

* * * * *